United States Patent
Hwang et al.

(10) Patent No.: US 9,613,207 B2
(45) Date of Patent: Apr. 4, 2017

(54) METHOD AND APPARATUS FOR PREVENTING AUTORUN OF PORTABLE USB STORAGE

(75) Inventors: Hyun Uk Hwang, Daejeon (KR); Ki Bom Kim, Cheongju-si (KR); Gi Han Kim, Daejeon (KR); Sung Il Lee, Daejeon (KR); Tae Joo Chang, Daejeon (KR); Cheol Won Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 583 days.

(21) Appl. No.: 12/849,068

(22) Filed: Aug. 3, 2010

(65) Prior Publication Data
US 2011/0099639 A1  Apr. 28, 2011

(30) Foreign Application Priority Data

Oct. 26, 2009 (KR) .................. 10-2009-0101790

(51) Int. Cl.
| G06F 7/04 | (2006.01) |
| G06F 17/30 | (2006.01) |
| H04N 7/16 | (2011.01) |
| G06F 21/50 | (2013.01) |
| G06F 21/56 | (2013.01) |
| G06F 21/78 | (2013.01) |

(52) U.S. Cl.
CPC .............. G06F 21/50 (2013.01); G06F 21/56 (2013.01); G06F 21/78 (2013.01)

(58) Field of Classification Search
CPC .............. G06F 21/575; G06F 9/30094; G06F 9/30189; G06F 9/3865; G06F 11/0772; G06F 2205/126; G06F 2212/7209
USPC .......................................... 726/27
See application file for complete search history.

(56) References Cited

U.S. PATENT DOCUMENTS

| 6,778,974 B2 * | 8/2004 | Moore et al. | |
| 7,239,166 B2 * | 7/2007 | Braverman et al. | 324/762.01 |
| 7,370,166 B1 * | 5/2008 | Ramesh et al. | 711/163 |
| 7,765,400 B2 * | 7/2010 | Costea et al. | 713/165 |
| 7,831,789 B1 * | 11/2010 | Per et al. | 711/162 |
| 7,865,493 B2 * | 1/2011 | Kim et al. | 707/706 |

(Continued)

FOREIGN PATENT DOCUMENTS

| JP | 2008-210220 A | 9/2008 |
| KR | 10-2009-0054359 A | 5/2009 |
| KR | 1020090054359 A | 5/2009 |

OTHER PUBLICATIONS

KIPO Office Action for Korean Patent Application No. 10-2009-0101790 which corresponds to U.S. Appl. No. 12/849,068.

Primary Examiner — Aaron Strange
Assistant Examiner — Tariq Najee-Ullah
(74) Attorney, Agent, or Firm — LRK Patent Law Firm (57) ABSTRACT

Provided is a technology which creates an autorun file that is used in autorun for preventing the autorun of a USB-based portable storage, thereby allowing an arbitrary user or worm virus not to manipulate the autorun file. A method for preventing autorun of portable storage accesses at least one of a master file table entry of a root directory and a master file table entry of an autorun file, and sets non-autorun in the at least one accessed master file table entry.

16 Claims, 8 Drawing Sheets

(56) References Cited

U.S. PATENT DOCUMENTS

| | | | |
|---|---|---|---|
| 7,996,903 B2* | 8/2011 | Sprowls | 726/24 |
| 8,065,730 B1* | 11/2011 | Sobel et al. | 726/22 |
| 8,086,652 B1* | 12/2011 | Bisson et al. | 707/823 |
| 8,087,091 B2* | 12/2011 | Risan et al. | 726/31 |
| 8,161,562 B1* | 4/2012 | Risan | G06F 21/10 713/193 |
| 8,793,465 B1* | 7/2014 | Forgette et al. | 711/201 |
| 2002/0080948 A1* | 6/2002 | Canali et al. | 379/229 |
| 2003/0115146 A1* | 6/2003 | Lee et al. | 705/57 |
| 2003/0115147 A1* | 6/2003 | Feldman et al. | 705/64 |
| 2003/0120619 A1* | 6/2003 | Osborn | 706/19 |
| 2003/0135465 A1* | 7/2003 | Lee et al. | 705/51 |
| 2003/0149668 A1* | 8/2003 | Lee et al. | 705/51 |
| 2003/0188183 A1* | 10/2003 | Lee et al. | 713/200 |
| 2005/0169467 A1* | 8/2005 | Risan | G11B 20/00086 380/201 |
| 2006/0031940 A1* | 2/2006 | Rozman et al. | 726/27 |
| 2006/0161725 A1* | 7/2006 | Lee et al. | 711/103 |
| 2007/0226265 A1* | 9/2007 | Nichols et al. | 707/200 |
| 2008/0115071 A1* | 5/2008 | Fair | 715/764 |
| 2008/0147964 A1* | 6/2008 | Chow et al. | 711/103 |
| 2009/0063570 A1* | 3/2009 | Nichols et al. | 707/200 |
| 2009/0113128 A1* | 4/2009 | Zhao | 711/115 |
| 2009/0138969 A1* | 5/2009 | Kim et al. | 726/22 |
| 2009/0187898 A1* | 7/2009 | Jayet et al. | 717/164 |
| 2010/0036973 A1* | 2/2010 | Mardiks et al. | 710/13 |
| 2010/0169394 A1* | 7/2010 | Hahn | 707/828 |
| 2011/0010778 A1* | 1/2011 | Risan | G06F 21/10 726/30 |
| 2011/0016280 A1* | 1/2011 | Chang et al. | 711/161 |
| 2011/0099639 A1* | 4/2011 | Hwang et al. | 726/27 |
| 2011/0213809 A1* | 9/2011 | Ardanza Azcondo et al. | 707/802 |

* cited by examiner

METHOD AND APPARATUS FOR PREVENTING AUTORUN OF PORTABLE USB STORAGE

CROSS-REFERENCE TO RELATED APPLICATIONS

This application claims priority under 35 U.S.C. §119 to Korean Patent Application No. 10-2009-0101790, filed on Oct. 26, 2009, in the Korean Intellectual Property Office, the disclosure of which is incorporated herein by reference in its entirety.

TECHNICAL FIELD

The following disclosure relates to the setting of a function for preventing the autorun of a portable USB storage, and in particular, to a method and apparatus for preventing autorun of portable USB storage, which enables to prevent arbitrary deletion and access of an Autorun.inf file, being a configuration file, about autorun.

BACKGROUND

The autorun function of Windows is a technology that automatically executes programs when media such as Compact Disk (CD) and Digital Video Disk (DVD) or a USB memory is inserted into a computer. Recently, as a portable storage such as USB memory is generalized as a data moving means, the autorun function is widely being used.

Recently, however, the autorun function of a portable storage such as USB memory is illegally being used as a means for the spread infection of malicious codes such as viruses and worm virus. The moment an infected USB memory is connected to a Personal Computer (PC), Confiker or 2090 virus that infects many PCs is copied to a corresponding PC by the autorun function of a window Operating System (OS), and consequently, the PC is infected with a malicious code.

Accordingly, a method is required which prevents spread and infection by preventing autorun in a USB-based storage itself.

SUMMARY

In one general aspect, a method for preventing autorun of portable storage includes: accessing at least one of a master file table entry of a root directory and a master file table entry of an autorun file; and setting non-autorun in the at least one accessed master file table entry.

In another general aspect, an apparatus for preventing autorun of portable storage includes: an access module accessing a portable storage; and a non-autorun module checking whether non-autorun is set in a volume of the portable storage, and setting non-autorun when non-autorun is not set.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a case in which as a file system, a portable storage is a USB-based storage including an NT File System (NTFS) will be described as an example.

Figure 1:
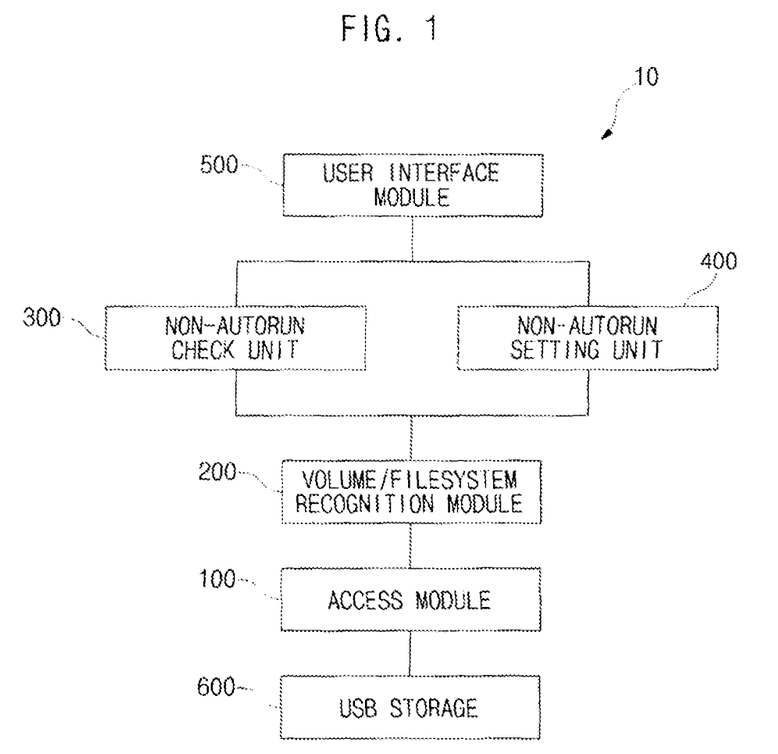
FIG. 1 is a block diagram illustrating an apparatus for preventing autorun of portable storage according to an exemplary embodiment.
Figure 2:
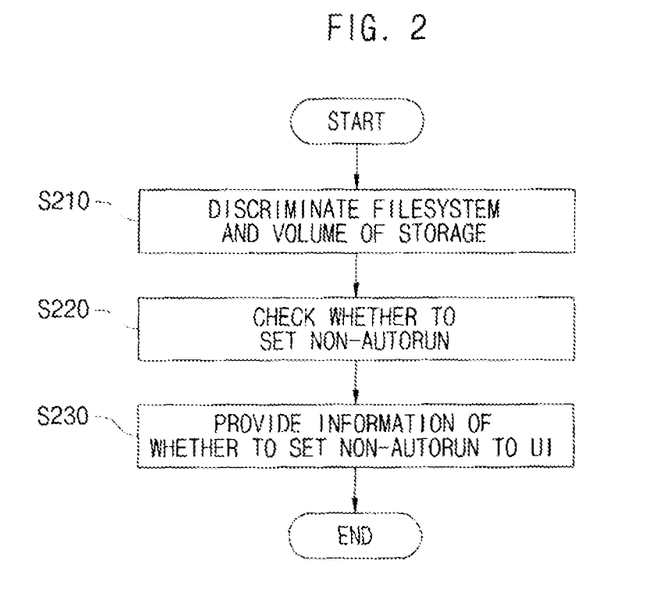
FIG. 2 is a flow chart illustrating a method for checking whether a non-autorun function is set in a portable storage.
Figure 3:
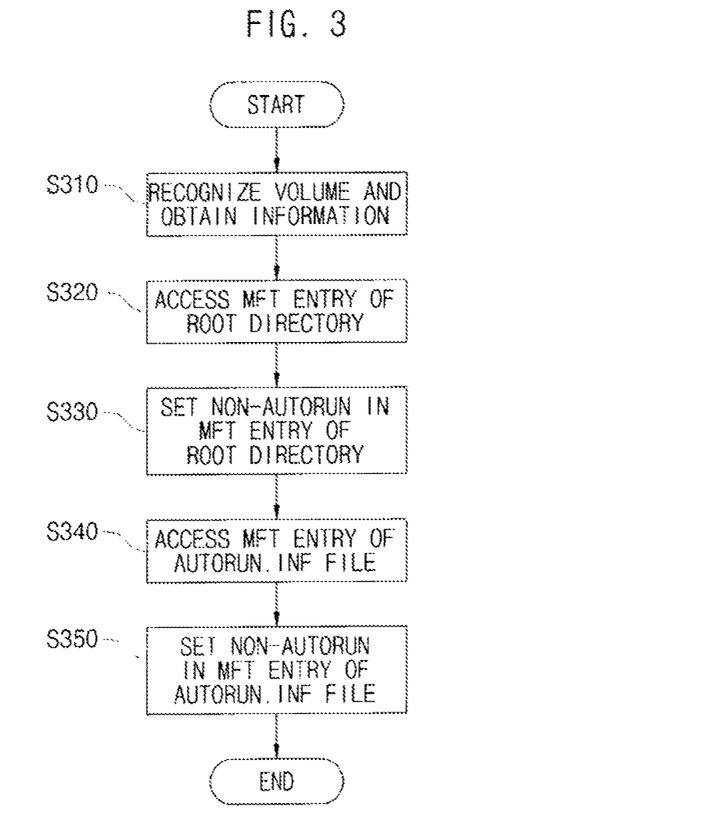
FIG. 3 is a flow chart illustrating a method for setting a non-autorun function in a portable storage.

A method and apparatus for preventing autorun of portable storage according to an exemplary embodiment will be described below with reference to FIGS. 1 to 3. FIG. 1 is a block diagram illustrating an apparatus for preventing autorun of portable storage according to an exemplary embodiment. FIG. 2 is a flow chart illustrating a method for checking whether a non-autorun function is set in a portable storage. FIG. 3 is a flow chart illustrating a method for setting a non-autorun function in a portable storage.

Referring to FIG. 1, an apparatus 10 for preventing autorun of portable storage according to an exemplary embodiment includes an access module 100, a volume/filesystem recognition module 200, a non-autorun module 300 and 400, and a user interface module 500.

The access module 100 accesses a USB storage 600 to read/write data.

The volume/filesystem recognition module 200 obtains the information of the USB storage 600 to recognize a filesystem that exists in the drive name of each volume and the volume in operation S210.

The non-autorun module 300 and 400 checks whether a non-autorun function is set in the USB storage 600. When the non-autorun function is not set, the non-autorun module 300 and 400 sets the non-autorun function. The non-autorun module 300 and 400 includes a non-autorun check unit 300 and a non-autorun setting unit 400.

The non-autorun check unit 300 checks whether the non-autorun function is set in the USB storage 600 in operation S220, and provides information on whether the non-autorun function is set through the user interface module 500.

The non-autorun setting unit 400 sets the non-autorun function for a volume in which the non-autorun function is not set, on the basis of the information associated with the setting of the non-autorun function that is determined by the non-autorun check unit 300. For example, the non-autorun setting unit 400 directly accesses the disk of a portable storage to manipulate (or change) the index attribute of a root directory, thereby preventing access to an Autorun.inf file. The non-autorun setting unit 400 manipulates (or changes) the attribute of the Master File Table Entry (hereinafter referred to as MFT Entry) of an autorun file, thereby preventing access to the autorun file.

Specifically, when the volume/filesystem recognition module 200 recognizes the volume of the USB storage 600 and obtains information on a filesystem in operation S310, the non-autorun setting unit 400 accesses the MFT Entry of the root directory in operation S320, and sets the non-autorun function in the MFT Entry in operation S330. Furthermore, the non-autorun setting unit 400 accesses an autorun file, for example, the MFT Entry of the Autorun.inf file (hereinafter, a case in which the autorun file is the Autorun.inf file will be described as an example) in operation S340, and sets the non-autorun function in the MFT Entry in operation S350.

When the Autorun.inf file does not exist in the USB storage 600, the non-autorun setting unit 400 creates an Autorun.inf file and sets the non-autorun function in the MFT Entry of the created Autorun.inf file. Alternatively, when the Autorun.inf file already exist in the USB storage 600, the non-autorun setting unit 400 backs up the existing Autorun.inf file, creates a new Autorun.inf file, and sets the non-autorun function in the MFT Entry of the created Autorun.inf file. Moreover, the non-autorun setting unit 400 can prevent access to the Autorun.inf file by using a security descriptor when creating the Autorun.inf file. Alternatively, as described above, the non-autorun setting unit 400 disables to delete an autorun file in which an attribute is manipulated (or changed). A detailed description associated with this will be described with reference to FIG. 8.

The user interface module 500 provides information on whether to set the non-autorun function and the drive names and filesystem information of volumes that are recognized in the volume/filesystem recognition module 200, to a user.

In this way, the method and apparatus for preventing autorun according to an exemplary embodiment analyze a USB-based portable storage 600 that is connected to a PC to recognize a volume and a filesystem, check whether the non-autorun function is set, and set the non-autorun function for an unset volume. That is, by setting the non-autorun function in the portable storage 600 itself, the method and apparatus can prevent virus infection due to autorun although the portable storage 600 is connected to all sorts of PCs.

More specifically, before describing the method and apparatus for preventing autorun according to an exemplary embodiment, the Master File Table (MFT) and MFT Entry of the NTFS will be described below with reference to FIGS. 4 to 7.

Figure 4:
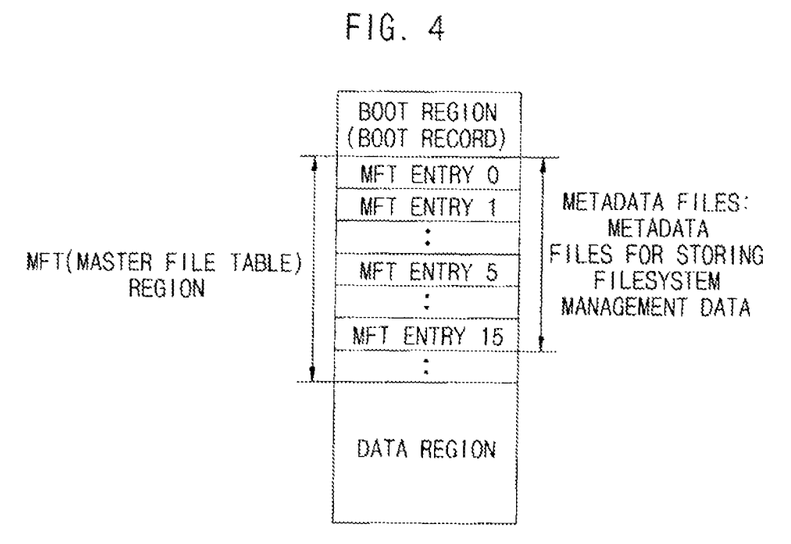
FIG. 4 is a conceptual view illustrating the structure of MFT.
Figure 6:
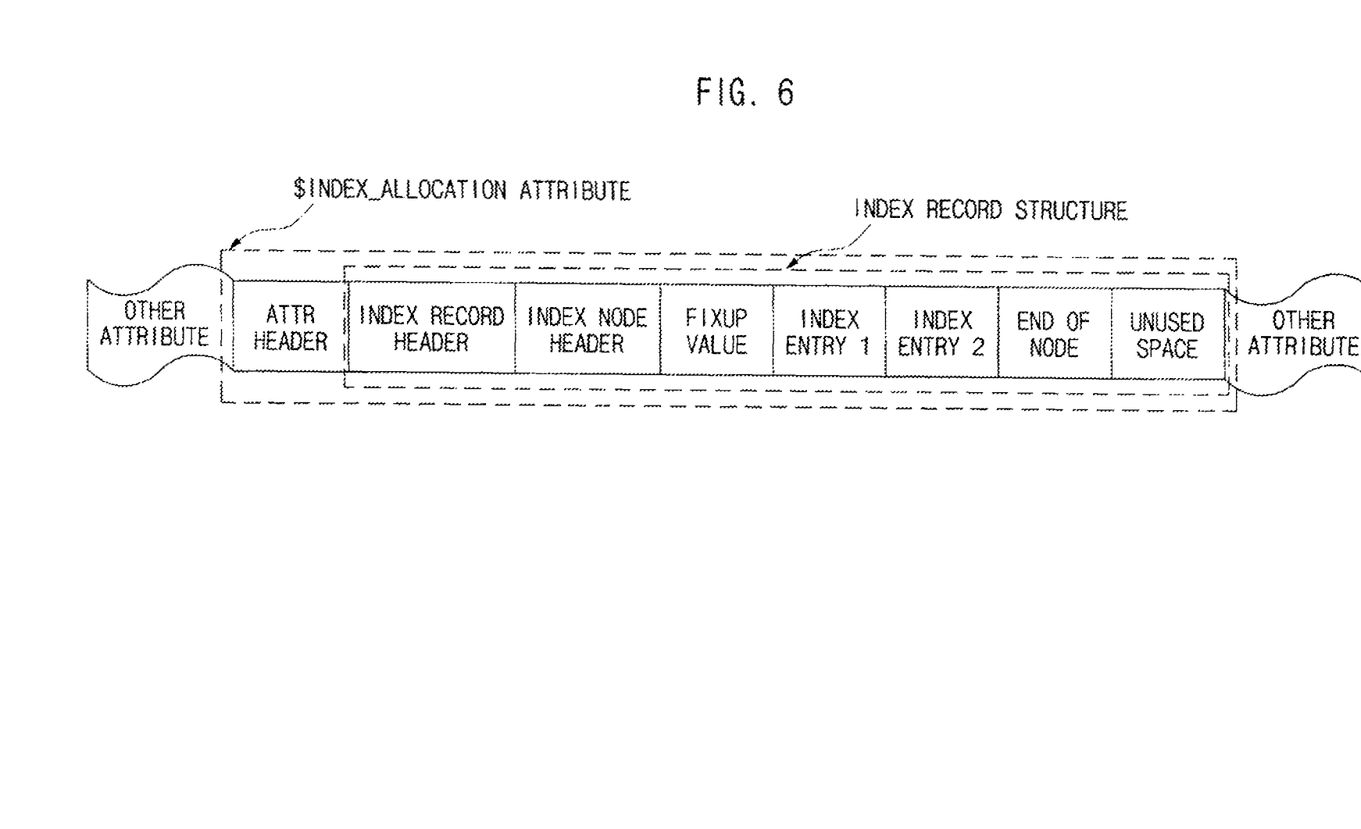
FIG. 6 is a conceptual view illustrating a $INDEX_ROOT attribute which is one of the attributes of the MFT Entry.
Figure 7:
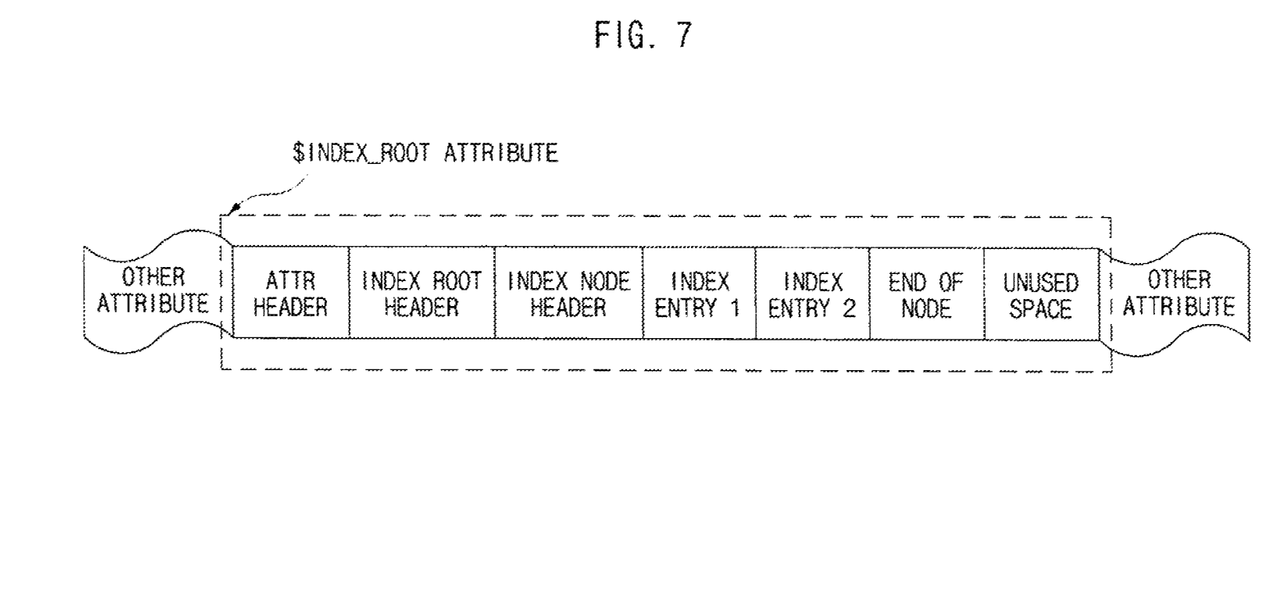
FIG. 7 is a conceptual view illustrating a $INDEX_AL-LOCATION attribute which is one of the attributes of the MFT Entry.

FIG. 4 is a conceptual view illustrating the structure of each MFT Entry. FIG. 6 is a conceptual view illustrating a $INDEX_ROOT attribute which is one of the attributes of the MFT Entry. FIG. 7 is a conceptual view illustrating a $INDEX_ALLOCATION attribute which is one of the attributes of the MFT Entry.

To provide a description on the structure of the NTFS with reference to FIG. 4, the NTFS may be divided into a boot region, an MFT region and a data region. The NTFS manages files and directories through the MFT, and stores real information in the data region. The MFT is a set of MFT Entries, and one MFT Entry has information on one file or directory. One MFT Entry stores information on one file or directory. When all file or directory information may not be stored in one MFT Entry, it is distributed to and stored in several MFT Entries. When file or directory information is distributed to and stored in several MFT Entries, any one of the MFT Entries is called a base MFT Entry, and MFT Entries other than the base MFT Entry are called non-base MFT Entries. The size of the MFT Entry is recorded in a Boot Record (BR), and in the case of an NTFS filesystem, the size of one MFT Entry is 1 Kbyte. The metadata information of each file is stored in respective attributes in the MFT Entry, and the attribute is configured with an attribute header and an attribute stream (see FIG. 5). An NTFS system manages the content of a real file as a $DATA attribute. When the size of data is small, the $DATA attribute exists as a stream in the MFT Entry (this is called a resident attribute). When the size of data is large, the NTFS system separately stores the $DATA attribute in the data region and stores only the location of the data region, which stores data, in the MFT Entry (this is called a non-resident attribute).

Numbers which are allocated to the MFT Entry will specifically be described below with reference to Table 1 below.

TABLE 1

| EntryNumber | FileName | Description |
| --- | --- | --- |
| 0 | $MFT | File including the total contents of an MFT Entry |
| 1 | $MFTMirr | Backup of an MFT file |
| 2 | $LogFile | Record a transaction log |
| 3 | $Volume | Store the label, version, serial number, creation time and dirty flag of a volume |
| 4 | $AttrDef | Attribute definition |
| 5 | .(Dot) | Root directory of a filesystem |
| 6 | $Bitmap | Allocation management information of a filesystem |
| 7 | $Boot | Boot record |
| 8 | $BadClus | Bad cluster list |
| 9 | $Quota (NT) | Disk quato information |
| 9 | $Secure (2K) | Security and access authority information |
| 10 | $Upcase | Store the capital of a Unicode character |
| 11 | $Extend (2K) | Extension information directory: $ObjId, $Quota, $Reparse, $UsnJrnl |

TABLE 1-continued

| EntryNumber | FileName | Description |
|---|---|---|
| 12-15 | <Unused> | Set as "in use" but empty |
| 16-23 | <Unused> | Empty |
| Any | $ObjId (2K) | Store the unique ID information of a file |
| Any | $Quota (2K) | Store quota information |
| Any | $Reparse (2K) | Reparse point information |
| Any | $UsnJrnl (2K) | File or directory change record |
| 24- | | General files and general directories |

Referring to the Table 1, MFT Entry numbers 0-15 are allocated to metadata files that store a filesystem management data, and when a new file is created, an MFT Entry next to an MFT Entry of the last number, which is allocated to the existing metadata files, has a structure in which it is sequentially allocated to newly-created metadata files or is allocated to an empty MFT Entry.

Figure 5:
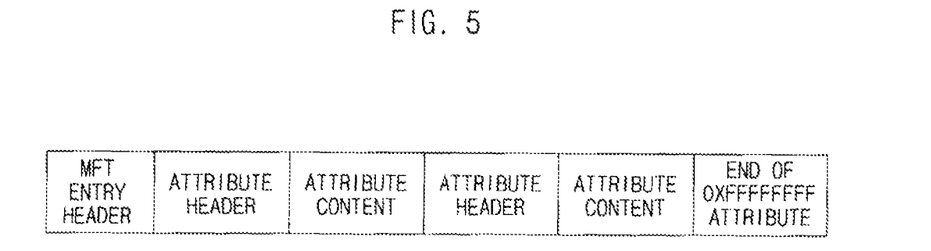
FIG. 5 is a conceptual view illustrating the structure of each MFT Entry.

To provide a description on the internal structure of the MFT Entry with further reference to FIG. 5, the MFT Entry is largely divided into an MFT Entry header and attribute. The MFT Entry header includes the information and state of the MFT Entry. The size of the MFT Entry header may be changed according to a Windows version. A size value is included in the item of the MFT Entry header. An attribute is a data structure having the various information of a file, and the kind of the attribute is as listed in Table 2 below.

TABLE 2

| Attribute Name | IDENTIFIER of Attribute Header |
|---|---|
| $STANDARD_INFORMATION | 10 00 00 00 |
| $ATTRIBUTE_LIST | 20 00 00 00 |
| $FILE_NAME | 30 00 00 00 |
| $OBJECT_ID | 40 00 00 00 |
| $SECURITY_DESCRIPTOR | 50 00 00 00 |
| $VOLUME_NAME | 60 00 00 00 |
| $VOLUME_INFORMATION | 70 00 00 00 |
| $DATA | 80 00 00 00 |
| $INDEX_ROOT | 90 00 00 00 |
| $INDEX_ALLOCATION | A0 00 00 00 |
| $BITMAP | B0 00 00 00 |
| $REPARSE_POINT | C0 00 00 00 |
| $EA_INFORMATION | D0 00 00 00 |
| $EA | E0 00 00 00 |
| $LOGGED_UTILITY_STREAM | 00 01 00 00 |

Each of all attributes is divided into an attribute header and attribute content, and although the structure of the attribute content is changed according to the attributes, the structure of the attribute header is configured with two kinds of resident attribute and non-resident attribute. In the MFT Entry, portions other than the MFT Entry header store the attribute information of a file. In Microsoft Windows, the MFT Entry is called a file record.

The structure of the MFT Entry header will be described below with reference to the following Table 3.

TABLE 3

| Offset | Name | Description |
|---|---|---|
| 0-3 | Signature | 'FILE' character string |
| 4-5 | Offset of Fixup Array | Location of Fixup arrangement |
| 6-7 | Count of Fixup Value | The number of items of Fixup arrangement |
| 8-15 | LogFile Sequence Number | Location value of transaction |
| 16-17 | Sequence Value | Sequence value |
| 18-19 | Hard Link Count | The number of Hard Links |

TABLE 3-continued

| Offset | Name | Description |
|---|---|---|
| 20-21 | Offset to first Attribute | Offset in which the first attribute is started |
| 22-23 | Flags | State or attribute information of an MFT Entry |
| 24-27 | Used Size of MFT Entry | Actually-used size of MFT Entry |
| 28-31 | Allocated Size of MFT Entry | MFT Entry allocation size, 1024 byte |
| 32-39 | File Reference to Base MFT Entry | In the case of a non-base MFT Entry, the File Reference Address of a base MFT Entry |
| 40-41 | Next Attribute ID | IDs of attributes which are only allocated in an MFT Entry |

Referring to the Table 3, the size of an MFT Entry header is configured in the offset 20-21 byte, and a flag representing the attribute state of a corresponding MFT Entry is allocated to the offset 22-23 byte. The state of an MFT Entry for a flag value is listed in Table 4 below.

TABLE 4

| Flag value | Description |
|---|---|
| 00 00 | A corresponding MFT Entry denotes a deleted file |
| 01 00 | A corresponding MFT Entry denotes a file (an allocated file) which is being used |
| 02 00 | A corresponding MFT Entry denotes a deleted directory |
| 03 00 | A corresponding MFT Entry denotes a directory (an allocated directory) which is being used |

Subsequently, the index entry of an Autorun.inf file may be found in an MFT Entry 5 in FIG. 4. For describing this, an index structure will be described below with further reference to FIGS. 6 and 7.

An NTFS manages an index through a B-Tree scheme for supporting the fast search of materials. Index management is performed with two attributes of $INDEX_ROOT and $INDEX_ALLOCATION in an MFT Entry. Index configuration is largely divided into two kinds, i.e., a small index (or small directory) structure that is only configured with the $INDEX_ROOT attribute having the uppermost index node and a large index (or large directory) structure in which the $INDEX_ROOT and $INDEX_ALLOCATION attributes are configured together when a small index may not be configured because of the enlarging of an index entry, thereby being managed.

FIG. 6 illustrates a $INDEX_ROOT structure. FIG. 7 illustrates a $INDEX_ALLOCATION structure. In the $INDEX_ROOT and $INDEX_ALLOCATION of an index structure that is configured in this way, the index entry of an Autorun.inf file among an index entry may be found.

The configuration of an index entry in FIGS. 6 and 7 may be made as listed in Table 5 below.

TABLE 5

| Offset | Name | Description |
|---|---|---|
| 0-7 | File Reference Address of filename | MFT address value of a corresponding file or directory |
| 8-9 | Length of this Index Entry | Total size of an index entry |
| 10-11 | Length of $FILE_NAME | Size of $FILE_NAME attribute included in an index entry |
| 12-15 | Flags | Index entry state |
| 16- | $FILE_NAME attribute | Copy of the $FILE_NAME attribute of a corresponding file or directory |

TABLE 5-continued

| Offset | Name | Description |
| --- | --- | --- |
| Last 8 byte | VCN of child node in $INDEX_ALLOCATION | Location value of child's index node in a case where an index entry has the child |

From after the sixteenth offset, an $FILE_NAME attribute for the lower file of a corresponding directory is identically maintained in an index entry. When a window explorer selects a specific directory and shows a lower file/directory, it analyzes an index structure and shows the lower file/directory.

The following Table 6 shows the configuration of an $STANDARD_INFORMATION attribute in which an attribute type ID value is allocated as 0x00000010 in the Table 2.

TABLE 6

| Offset | Name | Description |
| --- | --- | --- |
| 0-7 | Creation Time | Creation Time |
| 8-15 | Modified Time | Modified Time |
| 16-23 | MFT Modified Time | MFT Modified Time |
| 24-31 | Accessed Time | Accessed Time |
| 32-35 | Flags | File Attribute |
| 36-39 | Maximum number of Version | Maximum Version of File |
| 40-43 | Version Number | File Version |
| 44-47 | Class ID | Class ID Information |
| 48-51 | Owner ID | Owner ID |
| 52-55 | Security ID | ID used in $SECURE file |
| 56-63 | Quota Charged | Weight of this file in the limited amount of a user |
| 64-71 | Update Sequence Number | Have the last update sequence number of a file |

The $STANDARD_INFORMATION attribute exists in all files and directories, and has information such as the creation time and date of a file, a file owner, a security descriptor and a file size. In the content of the $STANDARD_INFORMATION attribute, a flag which represents the characteristic of a file exists in the offset 32-35 byte. The meaning of value of the flag is as listed in Table 7 below.

TABLE 7

| Flag value | Description |
| --- | --- |
| 01 00 00 00 | Read Only |
| 02 00 00 00 | Hidden |
| 04 00 00 00 | System |
| 20 00 00 00 | Archive |
| 40 00 00 00 | Device |
| 80 00 00 00 | Normal |
| 00 01 00 00 | Temporary |
| 00 02 00 00 | Sparse File |
| 00 04 00 00 | Reparse Point |
| 00 08 00 00 | Compressed |
| 00 10 00 00 | Offline |
| 00 20 00 00 | Not Content Indexed |
| 00 40 00 00 | Encrypted |

The following Table 8 shows the configuration of an $FILE_NAME attribute in which an attribute type ID value is allocated as 0x00000030 in the Table 2.

TABLE 8

| Offset | Name | Description |
| --- | --- | --- |
| 0-7 | File Reference Address of Parent Directory | MFT Address of Parent Directory |
| 8-15 | Creation Time | Creation Time |
| 16-23 | Modified Time | Modified Time |
| 24-31 | MFT Modified Time | MFT Modified Time |
| 32-39 | Accessed Time | Accessed Time |
| 40-47 | Allocated Size of File | Allocated Size of File |
| 48-55 | Real Size of File | Real Size of File |
| 56-59 | Flags | Attribute of File |
| 60-63 | Reparse Value | Reparse Type |
| 64-64 | Length of FileName | Length of Name |
| 65-65 | Name Space | Form of Name |
| 66- | Name | File Name |

The $FILE_NAME attribute has information related to the name of a file or the name of a directory. In the content of the $FILE_NAME attribute, a flag which represents the characteristic of a file exists in the offset 56-59 byte. The meaning of value of the flag is as listed in Table 9 below.

TABLE 9

| Flag value | Description |
| --- | --- |
| 01 00 00 00 | Read Only |
| 02 00 00 00 | Hidden |
| 04 00 00 00 | System |
| 20 00 00 00 | Archive |
| 40 00 00 00 | Device |
| 80 00 00 00 | Normal |
| 00 01 00 00 | Temporary |
| 00 02 00 00 | Sparse File |
| 00 04 00 00 | Reparse Point |
| 00 08 00 00 | Compressed |
| 00 10 00 00 | Offline |
| 00 20 00 00 | Not Content Indexed |
| 00 40 00 00 | Encrypted |
| 00 00 00 10 | Directory |
| 00 00 00 20 | Index View |

The MFT and MFT Entry of the NTFS have been described above. Hereinafter, based on the above description, the method and apparatus for preventing autorun according to an exemplary embodiment will be described in detail with reference to FIGS. 8 to 10.

Figure 8:
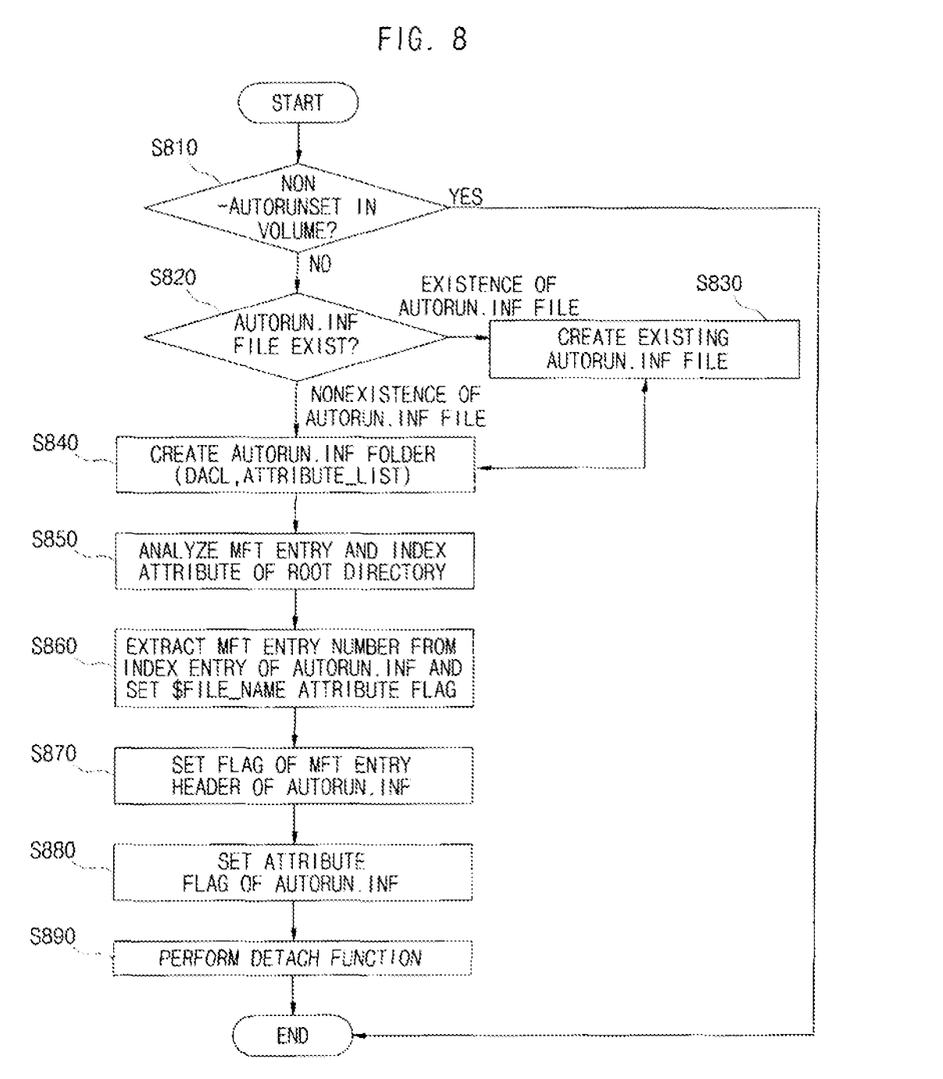
FIG. 8 is a flow chart illustrating a method for preventing autorun according to an exemplary embodiment.
Figure 9:
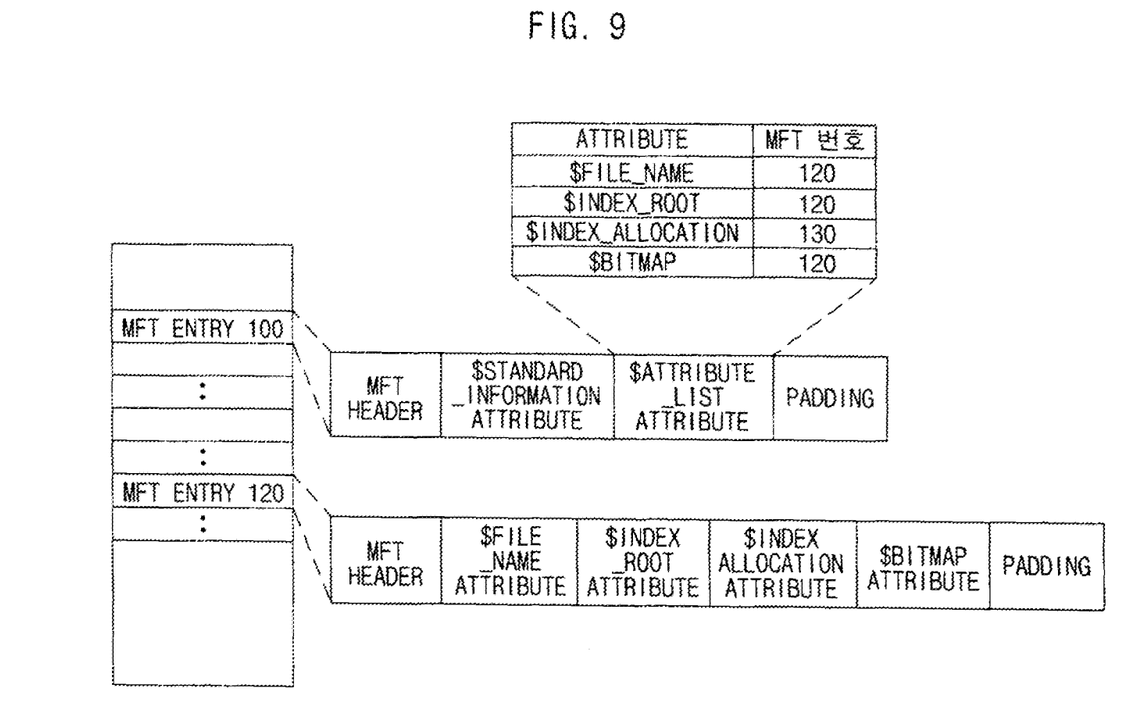
FIG. 9 is a conceptual view illustrating a form in which the information of an Autorun.inf file is distributed to and stored in a plurality of MFT Entries.
Figure 10:
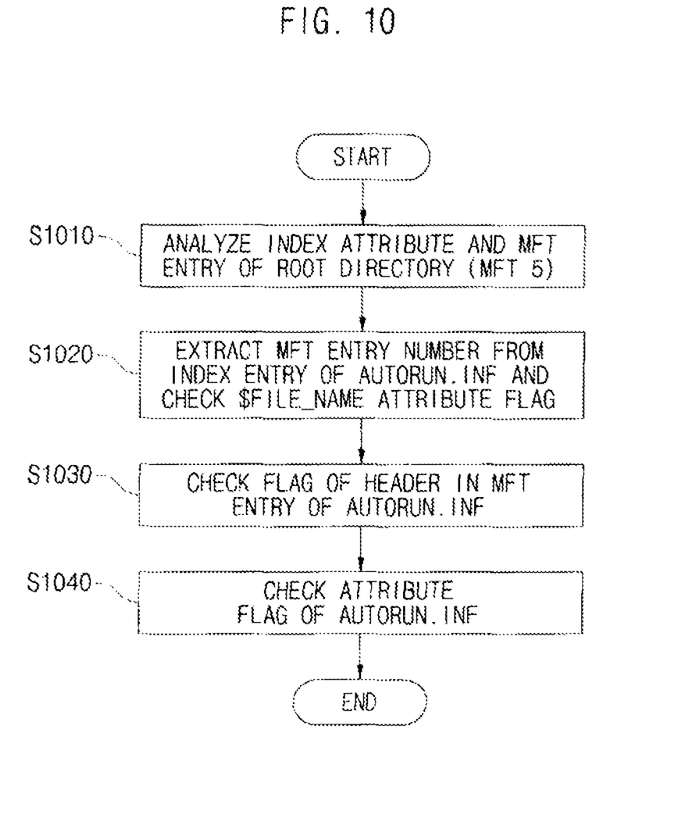
FIG. 10 is a flow chart for specifically describing operation S810 in FIG. 8.

FIG. 8 is a flow chart illustrating a method for preventing autorun according to an exemplary embodiment. FIG. 9 is a conceptual view illustrating a form in which the information of an Autorun.inf file is distributed to and stored in a plurality of MFT Entries. FIG. 10 is a flow chart for specifically describing operation S810 in FIG. 8.

A method for setting a non-autorun function may largely include creating an Autorun.inf file and setting a non-autorun function in the created Autorun.inf file.

Specifically, the non-autorun check unit 300 determines whether to set the non-autorun function for each volume in operation S810. When the non-autorun function is not set, the non-autorun setting unit 400 checks whether an Autorun.inf file exists in the uppermost portion of the volume in operation S820. For example, the non-autorun setting unit 400 may check whether the index entry information of the Autorun.inf file exists in a directory index structure that is stored in a root directory MFT Entry (see in FIGS. 5 to 7). When the Autorun.inf file exists, the non-autorun setting unit 400 backs up the existing file in operation S830, and creates a new Autorun.inf file (or folder) for setting the non-autorun function in operation S840.

The following two methods, which will be described below, may be sequentially performed while creating an Autorun.inf file (or folder).

First, setting the access control of a file may be performed. In the NTFS, a file or a directory may be created using a CreateFile function or a CreateDirectory function. The security descriptor of a user may be set in each file or directory, and access control for preventing access may be set using the security descriptor. A Discretionary Access Control List (DACL) may be set in the IpSecurityDescriptor of the following Table 12 by using an IpSecurityAttributes factor that indicates the SECURITY_ATTRIBUTES structure of the CreateDirectory function of the following Table 10 or the SECURITY_ATTRIBUTES structure of the CreateFile function of the following Table 11.

TABLE 10

```
BOOL WINAPI CreateDirectory(
    __in       LPCTSTR lpPathName,
    __in       LPSECURITY_ATTRIBUTES lpSecurityAttributes,
);
```

TABLE 11

```
HANDLE WINAPI CreateFile(
    __in       LPCTSTR lpFileName,
    __in       DWORD dwDesiredAccess,
    __in       DWORD dwShareMode,
    __in       LPSECURITY_ATTRIBUTES lpSecurityAttributes,
    __in       DWORD dwCreationDisposition,
    __in       DWORD dwFlagsAndAttributes,
    __in       HANDLE hTemplateFile
);
```

TABLE 12

```
typedef struct_SECURITY_ATTRIBUTES {
DWORD nLength;
    LPVOID lpSecurityDescriptor;
    BOOL bInheritHandle;
}   SECURITY_ATTRIBUTES,    *PSECURITY_ATTRIBUTES,
*LPSECURITY_ATTRIBUTES;
```

Through these setting, the read/writing/execution authorities of an administrator and user are not allowed, and the user may not access a created Autorun.inf file/directory. The following Table 13 shows an example of a pseudo code for creating an Autorun.inf directory when a USB storage is recognized as an E drive.

TABLE 13

```
Int MakeAutorunDir( )
{
    SECURITY_ATTRIBUTES sa;
    ...
    CreateDACL(&sa);            // DACL creation
    CreateDirectory(TEXT( "E:\\Autorun.inf" , &sa);
    ...
}
```

Second, applying the $ATTRIBUTE_LIST attribute of the NITS may be performed in order to make the access of an Autorun.inf file difficult in a filesystem.

As described above, when the attribute size of a file or directory is very large or there are many attributes, since the attributes cannot be stored in one MFT Entry, they are distributed to and stored in several MFT Entries. Herein, an $ATTRIBUTE_LIST attribute has information on what attribute is stored in which entry. In the above, in the case where information on Autorun.inf is stored in an MFT Entry when creating a file by applying a security descriptor, by allowing the $ATTRIBUTE_LIST attribute to be stored, an Autorun.inf file is created in order for an $FILE_NAME attribute not to exist in a base MFT Entry. An example of the MFT Entry configuration of the created Autorun.inf file (or folder) is illustrated in FIG. 9.

Referring to FIG. 9, when it is assumed that the number of the base MFT Entry of the created Autorun.inf file (or folder) is 100, a $ATTRIBUTE_LIST attribute is stored in the base MFT Entry 100, and other attributes are stored in a number 120 being a non-base MFT Entry. The base MFT Entry may include an MFT header, a $STANDARD_INFORMATION attribute and a $ATTRIBUTE_LIST attribute, and the base MFT Entry 120 may include an MFT header, a $FILE_NAME attribute, a $INDEX_ROOT attribute, $INDEX_ALLOCATION attribute and a $BITMAP attribute. For preventing a malicious attempt to unset a non-autorun function, the meta information of a file is distributed to and stored in several MFT Entries.

In a second stage, the method for preventing antorun analyzes an INDEX_ROOT attribute and an INDEX_ALLOCATION attribute in a root directory MFT Entry 5 through the access module 100 in operation S850, and finds the index entry of the above-created Autorun.inf file (or folder). The method sets the attribute flag of the $FILE_NAME attribute portion of the index entry of the Autorun.inf file (or folder) to [06 00 00 10], and extracts the MFT Entry number of the Autorun.inf file (or folder) from the index entry of the Autorun.inf file (or folder) in operation S860. This setting value is recognized as a hidden attribute and a system attribute in a file. An index attribute is one that Windows supports for managing a directory, and in the case of a window explorer that reads an index and represents window explorer file information, the index attribute is to represent the window explorer file information. Accordingly, when the attribute flag of the $FILE_NAME attribute portion of the index entry of the Autorun.inf file (or folder) is set to [06 00 00 10], a file is not shown by the function of the window explorer.

By using the MFT Entry number of the Autorun.inf file that is extracted from the index entry of the Autorun.inf file (or folder) in operation S860, the method moves to the MFT Entry of the Autorun.inf file (or folder) and performs analysis. The method may set the state flag of the header of the MFT Entry of the Autorun.inf file (or folder) in operation S870, and may set the attribute flag of the MFT Entry of the Autorun.inf file (or folder) in operation S880.

Specifically, the method may set the state flag of the header (see FIG. 9) of the MFT Entry of the Autorun.inf file (or folder) to [02 00]. This setting value denotes that the MFT Entry of the Autorun.inf file (or folder) is a deleted directory (see Table 4), but because the index entry of a corresponding Autorun.inf file (or folder) exists in a real root directory and remains in an index, by recognizing it as a corrupted file, access to the Autorun.inf file (or folder) is prevented.

The method sets the flags (see FIG. 9) of the $STANDARD_INFORMATION and $FILE_NAME attributes of the MFT Entry of the Autorun.inf file (or folder) to [06 00 00 00] and [06 00 00 10], respectively. These setting values are used to set a hidden attribute and a system attribute, as set in the index entry in the MFT Entry of the root directory.

The following Table 14 lists a rearrangement result that is obtained by rearranging the above-described contents, i.e., setting values in which flags are set in a target (for example, the MFT Entry of a root directory and the MFT Entry of an Autorun.inf file) that is accessed in the non-autorun setting unit 400 and an accessed target.

TABLE 14

| Access Target MFT Entry | Setting Target | General Value | Setting Value |
|---|---|---|---|
| MFT Entry 5 being Root Directory | Attribute flag which is disposed at offset 56-59 of $FILE_NAME in index entry of Autorun.inf | 00 00 00 10 | 06 00 00 10 06 00 00 00 |
| MFT Entry of Autorun.inf | MFT Entry state flag which is disposed at offset 22-23 of MFT Header | D: 03 00 F: 01 00 | D: 02 00 F: 00 00 |
| | Attribute flag which is disposed at offset 32-35 of $STANDARD_INFORMATION | 00 00 00 00 | 06 00 00 00 |
| | Attribute flag which is disposed at offset 56-59 of $FILE_NAME | 00 00 00 10 | D: 06 00 00 10 F: 06 00 00 00 |

D: when creating a directory,
F: when creating a file

When this setting is completed, the method calls the detach function of a device to connect/disconnect a USB storage in order to recognize the changed setting in operation S890. The detach function includes a transmitting of I/O Request Packet (IRP), such as IRP_MN_SURPRISE_REMOVAL, in order to reflect the content cached in the NTFS.

Operation S810 in FIG. 8 will be described in detail with reference to FIG. 10.

First, the method for preventing autorun analyzes the MFT Entry of a root directory, and analyzes a $INDEX_ROOT attribute and a $INDEX_ALLOCATION attribute which are attributes for managing indexes in operation S1010. The method checks whether the index entry of the Autorun.inf file among index entries storing information of each file exists. When the index entry of the Autorun.inf file does not exist, a non-autorun function is determined as not being set. When the index entry of the Autorun.inf file exists, the method analyzes the index entry, analyzes information of a $FILE_NAME attribute, which is started from offset 16 byte, to check a flag setting value, and parses a File Reference Address value that is disposed at offset 0-7 in the index entry item of the Autorun.inf file to extract the MFT Entry number of the Autorun.inf file in operation S1020. For example, the method analyzes the $FILE_NAME attribute information, and when the flag setting value is [06 00 00 10], the non-autorun function may be determined as being set (see Table 14).

The method moves to the MFT Entry number of the extracted Autorun.inf file and performs a next analysis. Specifically, the method checks a flag that is disposed at the offset 22-23 byte of a header in an MFT Entry of the Autorun.inf file in operation S1030. For example, when a flag value is [00 00], the non-autorun function may be determined as being set (see Table 14).

Third, the method checks the flag of the $STANDARD_INFORMATION attribute, and fourth, it checks the flag of the $FILE_NAME attribute in operation S1040. For example, when a flag value is [06 00 00], the non-autorun function may be determined as being set (see Table 14).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for preventing autorun of portable storage, the method comprising:
    accessing a master file table entry of a root directory of the portable storage;
    analyzing the accessed master file table entry of the root directory to find an index entry of the autorun file of the portable storage; and
    setting an attribute flag of $FILE_NAME attribute of an index entry of the autorun file to a first specific value which is assigned to prevent autorun of the portable storage, thereby preventing the portable storage from being infected with malicious codes,
    wherein the portable storage includes an NTFS (New Technology File System).

2. The method of claim 1, wherein as the attribute flag is set to the first specific value, an attribute of the autorun file is changed to a hidden attribute or a system attribute.

3. The method of claim 1, further comprising setting a state flag of a header in the accessed master file table entry of the autorun file to a second specific value or setting an attribute flag in the accessed master file table entry of the autorun file to a third specific value.

4. The method of claim 3, wherein as the attribute flag or the state flag is set to the second or third specific value, the autorun file is recognized as a deleted or corrupted file, or an attribute of the autorun file is changed to a hidden attribute or a system attribute.

5. The method of claim 1, further comprising creating an autorun file for setting of non-autorun in the portable storage if there is no autorun file as a result of analyzing.

6. The method of claim 5, wherein the creating of the autorun file comprises setting access control for preventing access to the autorun file by using a security descriptor.

7. The method of claim 5, wherein the creating of the autorun file comprises distributing attributes of the created autorun file to at least two master file table entries to store the distributed attributes in the master file table entries.

8. The method of claim 7, wherein the distributing comprises:
    storing $ATTRIBUTE_LIST attribute in a base master file table entry; and storing attributes other than the $ATTRIBUTE_LIST attribute in a non-base master file table entry.

9. A method for preventing autorun of portable storage, the method comprising:
 accessing a master file table entry of a root directory of the portable storage;
 analyzing the accessed master file table entry of the root directory to find an index entry of the autorun file of the portable storage;
 creating a backup file of the autorun file;
 creating a new autorun file for setting of non-autorun in the portable storage; and
 setting an attribute flag of $FILE_NAME attribute of an index entry of the new autorun file to a first specific value which is assigned to prevent autorun of the portable storage, thereby preventing the portable storage from being infected with malicious codes,
 wherein the portable storage includes an NTFS (New Technology File System).

10. The method of claim 9, wherein the creating of the new autorun file comprises setting access control for preventing access to the new autorun file by using a security descriptor.

11. An apparatus for preventing autorun of portable storage, the apparatus including a storage and a processor and comprising:
 an access module accessing a portable storage; and
 a non-autorun module analyzing a master file table entry of a root directory to find an index entry of an autorun file of the portable storage, and setting an attribute flag of $FILE_NAME attribute of an index entry of the autorun file to a first specific value which is assigned to prevent autorun of the portable storage, thereby preventing the portable storage from being infected with malicious codes,
 wherein the portable storage includes an NTFS (New Technology File System).

12. The apparatus of claim 11, wherein the non-automn module sets a state flag of a header in the master file table entry of the autorun file to a second specific value or setting an attribute flag in the master file table entry of the autorun file to a third specific value.

13. The apparatus of claim 11, wherein the non-autorun module creates an autorun file for setting of non-autorun in the portable storage if there is no autorun file as a result of analyzing.

14. The apparatus of claim 13, wherein the non-autorun module sets an access control for preventing access to the autorun file using a security descriptor.

15. The apparatus of claim 13, wherein the non-autorun module distributes attributes of the created autorun file to at least two master file table entries to store the distributed attributes in the master file table entries.

16. The apparatus of claim 15, wherein the non-autorun module stores $ATTRIBUTE_LIST attribute in a base master file table entry; and stores attributes other than the $ATTRIBUTE_LIST attribute in a non-base master file table entry.

* * * * *